Ｕnited States Patent
Britton

[15] 3,686,334
[45] Aug. 22, 1972

[54] DIRECT HYDRATION OF ETHYLENE TO ETHANOL

[72] Inventor: Robert A. Britton, 43 B Minebrook Rd., Edison, N.J. 08817

[73] Assignee: Esso Research and Engineering Company

[22] Filed: Jan. 13, 1969

[21] Appl. No.: 790,831

[52] U.S. Cl..................................................260/641
[51] Int. Cl.............................C07c 29/04, C07c 29/08
[58] Field of Search.........................................260/641

[56] References Cited

UNITED STATES PATENTS

| | | | |
|---|---|---|---|
| 2,486,980 | 11/1949 | Robinson | 260/641 |
| 2,496,621 | 2/1950 | Deery | 260/641 |
| 2,569,092 | 9/1951 | Deering | 260/641 X |
| 2,579,601 | 12/1951 | Nelson et al. | 260/641 |
| 2,673,221 | 3/1954 | Schrader et al. | 260/641 |
| 3,311,568 | 3/1967 | Jakov Levich | 260/641 X |
| 3,340,313 | 9/1967 | Mitsutani | 260/641 |
| 3,459,678 | 8/1969 | Hagemeyer et al. | 260/641 |

OTHER PUBLICATIONS

Merck Index, 8th edition, Merck & Co. Rahway N.J., 1968, p. 824

Primary Examiner—Howard T. Mars
Attorney—Chasan and Sinnock and J. E. Luecke

[57] ABSTRACT

Ethanol is produced through the direct hydration of ethylene by reacting a mixture of ethylene and water in the vapor phase over a supported sesqui-phosphoric acid catalyst. The preferred catalyst species is the hemihydrate of meta phosphoric acid. Typically, the direct hydration reaction is conducted at elevated pressures and at temperatures above the dew point of water at reaction conditions.

6 Claims, No Drawings

DIRECT HYDRATION OF ETHYLENE TO ETHANOL

BACKGROUND OF THE INVENTION

1. Field of the Invention

This invention relates to an improved process for the formation of ethanol through the direct hydration of ethylene. More particularly, this invention is directed to the preparation of ethanol by the reaction of a mixture of water and ethylene at elevated temperatures and pressures in the presence of a supported sesqui-phosphoric acid catalyst.

2. Description of the Prior Art

There are numerous literature references that teach the direct hydration of olefinic feedstocks to alkanols. For example, it is reported in British Pat. No. 586,282 that olefins can be catalytically hydrated to the corresponding alkanols using sulfuric acid as a catalyst. Anionic ion-exchange resins have also been employed as catalysts in the direct hydration of monoolefins to alcohols (see: U.S. Pat. No. 2,803,667). Supported tungstic acid catalysts have also been employed in promoting the hydration of olefins to alcohols (see: British Pat. Nos. 708,623 and 703,628). The use of phosphoric acid materials to catalyze the direct hydration reaction is also widely reported with ortho phosphoric acid being the preferred catalyst species. While numerous direct hydration techniques have been reported, the prior art operations are invariably characterized by extremely low olefin conversion. Accordingly, the alcohol yields normally secured are relatively small.

SUMMARY OF THE INVENTION

Now, in accordance with the present invention, it has been found that the yields normally associated with the direct hydration of ethylene to ethanol can be improved significantly by contacting a mixture of ethylene and water over a supported sesqui-phosphoric acid catalyst at elevated temperatures and pressures. Desirably, the catalyst is the hemihydrate of meta phosphoric acid. The hydration reaction is conveniently conducted in the vapor phase by passing a gaseous mixture of ethylene and water over a fixed bed of catalyst at temperatures ranging from 500° to 600° F. at an elevated pressure consistent with the prevention of the condensation of the water reactant at the conditions in the reaction zone.

It is preferred that the ethylene and water reagents employed in the process be substantially pure. Desirably, the ethylene fed to the reaction zone is at least about 99 wt. percent ethylene. Acetylenic impurities should be particularly avoided in that their presence results in the formation of undesired by-product materials. Process impurities normally associated with ethylene and water do not materially affect catalyst performance; however, their presence normally causes the process to be plagued with purge and recycle problems. It is highly desirable, although not essential, that the reaction zone be free of any substantial uncontrolled quantities of liquid water because liquid water serves to hydrolyze the phosphoric acid catalyst to an undesired catalyst specie and may also serve to degrade the catalyst support structure. The vaporized water and ethylene may be introduced into the reaction zone either as single streams or as a mixture. The molar ratio of water to ethylene within the reaction zone may vary from about 0.1:1 to about 20:1; however, it is preferred that the water/ethylene molar ratio within the reaction zone range from about 0.5:1 to 1.5:1. Most preferably, the molar ratio of water to ethylene within the reaction zone is maintained at about 0.65 moles of water per mole of ethylene.

The direct hydration reaction is conducted at temperatures ranging from 500° to 600° F., preferably at temperatures varying from 520° to 540° F. Preferably, the reaction zone pressure is maintained at the highest level possible without causing condensation of the water vapor present at the conditions prevailing within the reaction zone. Typically, reaction zone pressures vary from 800 to 1,100 psig, most preferably about 1,000–1,050 psig are employed. The vaporized ethylene and water are introduced into the reactor, preferably a fixed bed reactor, at a vapor space velocity of about 10 to 60 standard cubic feet of total ethylene and water vapor per cubic foot of catalyst per minute where standard gas conditions are understood to be 1 atmosphere and 60° F. However, it is preferred that the reaction zone space velocity be maintained at a level varying between 25 and 35 standard cubic feet of ethylene and water vapor per cubic foot of catalyst per minute.

The nature of the catalyst employed in promoting the instant direct hydration reaction is a critical element of the process. As noted earlier, the catalyst employed consists of a sesqui-phosphoric acid active ingredient impregnated on an inert support material. Since phosphoric acid exists in many forms, various nomenclatures have developed in identifying the material. One typical technique for characterizing phosphoric acid materials is the relative molar ratios of phosphorus pentoxide ($P_2O_5$) to water making up the (polymeric) acid structure. Hence, with ortho-phosphoric acid, the molar ratio of phosphorus pentoxide to water is 1:3. With pyrophosphoric acid, the molar ratio of phosphorus pentoxide to water is 1:2. Meta phosphoric acid is conventionally characterized as being composed of a 1:1 molar ratio of phosphorus pentoxide to water.

The preferred active catalyst specie is a sesqui-phosphoric acid characterized by a $P_2O_5:H_2O$ mole ratio within the limits of 1:>1 to 1:<2. The most preferred catalyst specie is the hemihydrate of meta phosphoric acid, that is, a material having a phosphorus pentoxide to water molar ratio of about 1:1.5. Hence, the preferred active catalyst species exist between materials typically denominated as pyrophosphoric acid and metaphosphoric acid. While the catalyst initially charged to the reaction zone may be of a type having a relative phosphorus pentoxide to water molar ratio falling outside the desired limits, it is necessary that the actual operating catalyst be of a composition falling within the above ranges during the time of reaction. Catalysts with excessive amounts of water or with excessive amounts of phosphorus pentoxide may be brought within the desired limits by carefully controlling reaction temperature and/or water content of the incoming ethylene/water reactant streams.

The active sesqui-phosphoric acid catalyst materials are preferably supported on inert materials that are not seriously degraded at process conditions. Useful supports include materials of predominantly siliceous character such as diatomaceous earth, kieselguhr, and porous silica and alumina-silica materials. Other useful materials include coal, asbestos, charcoal, silicon carbide, etc. The sesqui-phosphoric acid normally makes up the major amount of the total catalyst material. Typically, the phosphorus content of the total impregnated catalyst, calculated as phosphorus pentoxide, is in the order of from 50 to 80 wt. percent of the total catalyst material.

The supported catalyst structures are typically prepared by admixing specified amounts of water and phosphorus pentoxide with a siliceous absorbent material. This crude mixture is then calcined at a temperature of 900° to 1,100° F. to form the essentially complete catalyst structure. As noted earlier, the catalyst from the calcining operation may not contain the desired $P_2O_5$:water molar ratios; however, the catalyst content must be at a level such that it can be adjusted within the reaction zone to the desired critical levels.

In a typical reaction procedure, a mixture of water and ethylene is passed through a furnace and brought to reaction temperature. The preheated vaporized mixture is then introduced into a tubular reactor containing a fixed bed of extruded diatomaceous earth pellets impregnated with a sesqui-phosphoric acid material. The temperature within the catalyst bed is maintained at about 520° to 540° F. and reaction zone pressures maintained at about 1,030 psig. The products from the fixed bed reaction are then condensed at an appropriate temperature thereby recovering the product ethanol and unreacted water as well as by-product diethyl ether. The unreacted ethylene is admixed with further amounts of water and returned to the reaction zone as recycle material. The by-product diethyl ether after separation from the ethanol/water stream can also be recycled to the reaction zone to be converted to ethanol product.

The amount of ether condensed is largely determined by the choice of condensor temperature. It is desirable to condense and recycle as much of the ether as possible since the selectivity of ethylene converted to ethanol is thereby improved. However, if condensation of the reaction products takes place under pressure, care must be taken to keep the temperature high enough to prevent solid ethylene hydrate formation.

DESCRIPTION OF THE PREFERRED EMBODIMENTS

The invention will be further understood by reference to the following Examples.

Example 1

To demonstrate the effectiveness of the instant process, a series of tests were conducted wherein the sesqui-phosphoric acid catalyst system of the invention and a conventional ortho phosphoric acid based catalyst system were employed for the direct hydration of ethylene to ethanol. Each of the experimental runs were conducted by passing vaporized ethylene and water over a fixed bed of about 34 cc of catalyst particles having an average particle diameter of about one-sixteenth inch. The particles were contained within a tubular reactor having an inside diameter of one-half inch. The sesqui-phosphoric acid catalyst material was composed of a porous alumina-silica support having an elemental composition of about 3.5 wt. percent $Al_2O_3$ and 96.5 wt. percent $SiO_2$, on which sesqui-phosphoric acid was impregnated. The sesqui-phosphoric acid content calculated as $P_2O_5$ was about 54.6 wt. percent with sufficient water to yield a mole ratio of $P_2O_5$ to $H_2O$ of 1:1.5.

In each of the tests, reaction zone pressure was maintained at about 1,030 psig and the reaction temperature was varied over a range of 500° to 700° F. The incoming reactant stream was composed of about 0.65 moles of water per mole of ethylene. The vaporized stream was passed through the tubular reactor at a vapor space velocity of 33 standard cubic feet per cubic foot of catalyst per minute. The results of the tests are set forth in Table I below.

TABLE I

| Run | Catalyst Type | Reaction temp. (°F.) | % Ethylene conversion | % selectivity to ethanol | % ethanol yield |
|---|---|---|---|---|---|
| 1 | Sesqui Phosphoric Acid | 504 | 5.4 | 86.1 | 4.6 |
| 2 | Sesqui Phosphoric Acid | 532 | 8.6 | 69.7 | 6.0 |
| 3 | Sesqui Phosphoric Acid | 565 | 9.2 | 62.0 | 5.7 |
| 4 | Sesqui Phosphoric Acid | 599 | 7.3 | 67.3 | 4.9 |
| 5 | Ortho Phosphoric Acid * | 565 | 4.4 | 87.7 | 3.8 |

*The ortho phosphoric acid catalyst consisted of substantially the same support but the mole ratio of $P_2O_5$:$H_2O$ was 1:3.

The above data clearly indicate the superiority of the instant sesqui-phosphoric acid catalyst systems for promoting the direct hydration of ethylene to ethanol. In contrast, when a conventional ortho phosphoric acid based catalyst system was used the percent ethanol yield was substantially below that secured when the sesqui-phosphoric acid catalyst system was used. In this regard a comparison of Run 3 with Run 5 indicates that approximately a 50 percent increase in ethanol yield is secured at identical conditions using the sesqui-phosphoric acid based catalyst system.

Having thus described the general nature and specific embodiments of the present invention, the true scope of the invention is now pointed out in the appended claims.

What is claimed is:

1. A process for the production of ethanol which comprises contacting ethylene and water in a water/ethylene mole ratio of about 0.65 moles of water per mole of ethylene within a reaction zone in the vapor phase over a catalyst, said catalyst having a phosphorous content, measured as phosphorous pentoxide, of from 50 to 80 wt. percent of the total weight of the catalyst and, consisting essentially of sesqui-phosphoric acid impregnated on a carrier, said sesquiphosphoric acid having a mole ratio of $P_2O_5:H_2O$ within the limits of 1:>1 to 1:<2; said reaction being conducted at a temperature ranging from about 500° to 600° F. and at a pressure ranging from 800 to 1,100 psig at a vapor space velocity ranging from 25 to 35 standard cubic feet of vaporous ethylene and water per cubic foot of catalyst per minute.

2. The process of claim 1 wherein said catalyst carrier is a siliceous absorbent material.

3. The process of claim 1 wherein said reaction is conducted at a temperature ranging from 520° to 540° F. at a pressure of from about 1,000 – 1,050 psig.

4. The process of claim 3 wherein said sesquiphosphoric acid is the hemihydrate of meta phosphoric acid.

5. The process of claim 4 wherein said carrier material is a porous alumina-silica material.

6. The process of claim 2 wherein said siliceous absorbent material is diatomaceous earth.

* * * * *